SECRECY FACSIMILE SYSTEM

Filed March 31, 1945

INVENTOR.
JAMES E. SMITH
BY H. G. Grover
ATTORNEY.

2,707,208

SECRECY FACSIMILE SYSTEM

James Ernest Smith, Jackson Heights, N. Y., assignor to Radio Corporation of America, a corporation of Delaware Application March 31, 1945, Serial No. 585,933

The terminal 15 years of the term of the patent to be granted has been disclaimed 1 Claim. (Cl. 178—22)

The present invention relates to communication systems, and more particularly, to systems for sending and receiving intelligence signals such as facsimile signals in secrecy. More specifically, the present invention relates to secret communication systems wherein a plurality of signals can be interchanged in random fashion so that while the plurality of signals are being transmitted simultaneously, the intelligence on any one signal channel is discontinuous.

Briefly, according to the invention, a number of intelligence signal sources are connected over suitable transmission channels to a like number of receivers constructed and arranged to translate the intelligence signals into useful form. Means are provided for interchanging the connections between the signal sources and the channels in an entirely unpredictable manner. At an authorized group of receivers provision is made in accordance with the invention for interconnecting the receivers to the transmitter channels in step with the connection changes of the transmitters. At an unauthorized receiver or group of receivers it would not be possible to reassemble the original signals in intelligible form without knowing the coding or switching sequence of the channel interchange. The useful intelligence signals received at any one station are intermingled with other irrelevent intelligence signals so that at an unauthorized station, what appears to be a complete set of coded signals is, in reality, a jumble of relevant and irrelevant signals which cannot be decoded as there is no clue to the signals to be discarded in an attempt to decipher the message.

Features of the present invention are shown illustratively in connection with a facsimile communication system having two transmitters and two recorders with a synchronized random signal generator for controlling channel interchange at the transmitter and receiver locations. Interconnection of these signal generators to a pair of communication channels is shown as being effected by the random signal generator such as a code bearing or carrying member, for example, a perforated tape. Interconnection of the receivers to the channels occurs under control of a code member bearing an identical code.

The secrecy system disclosed herein may be added to existing equipment substantially without change in the scanning or recording systems or in the method of transmission normally employed. For example, the facsimile transmitters and receivers may be of any kind or type, and amplitude, frequency, or phase modulation of a subcarrier or a radio frequency carrier may be relied upon for transmission of signals. The subcarrier, however it is modulated with the image signals, may be used in turn to modulate a radio frequency carrier.

The principal object of the invention is to provide novel methods of and apparatus for preventing the intelligible reception of signals at receiving points except upon the performance of special switching operations simultaneously with like switching operations performed at the transmitting point.

Another object of the present invention is to provide for the performance of switching operations in a novel manner for the purpose of obtaining secrecy of communication.

A further object is to provide a novel arrangement for obtaining channel switching in a communication system in accordance with a predetermined code.

Other and more specific objects of the invention will become apparent and suggest themselves to those skilled in the art to which the invention is directed upon reading the following specification and claim in connection with the accompanying drawings in which:

Figure 1:
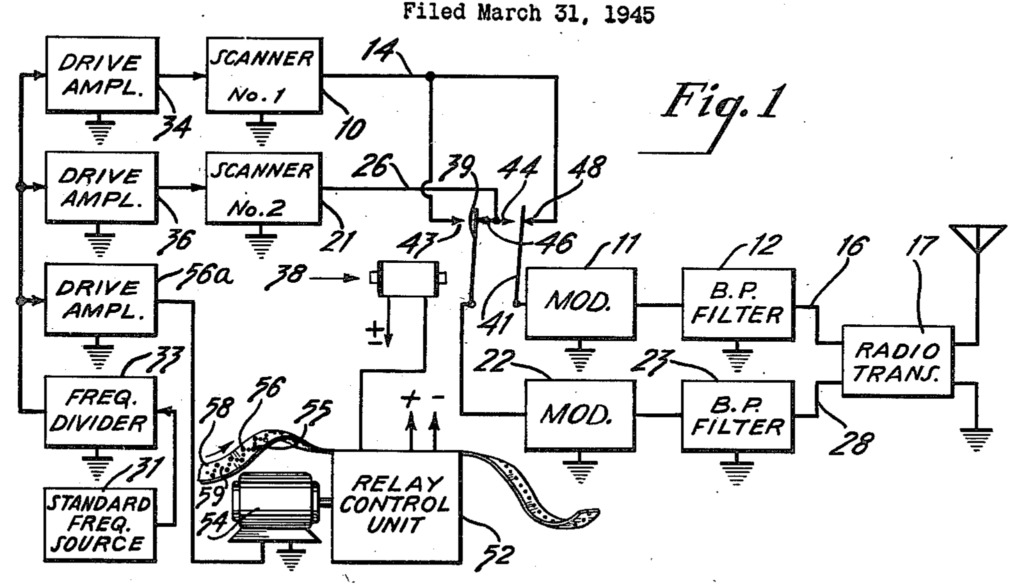
Fig. 1 is a schematic block diagram of a facsimile transmitting station embodying the invention.
Figure 3:
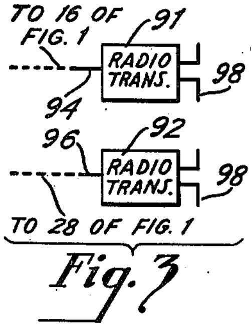
Figure 4:
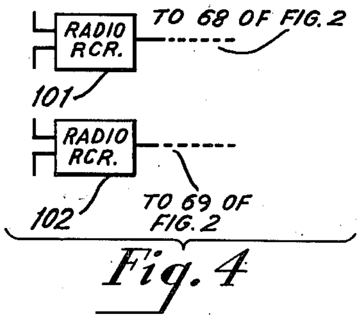

Fig. 3 indicates a slight modification of the transmitter terminal equipment shown by Fig. 1; and Fig. 4 is a diagrammatic showing of a modified receiving station.

Referring for the present to Fig. 1 which shows a transmitting terminal arrangement, units 10, 11, and 12 represent the usual terminal equipment required for one facsimile channel employing either amplitude, phase, or frequency modulation of a subcarrier. The several units may be of any desired type or kind usually employed for a similar purpose.

The unit 10 is labeled to indicate that it is a scanner and may include scanning apparatus of the kind shown in U. S. Patent No. 1,803,133, granted to R. H. Ranger on April 28, 1931, modified as suggested in the last paragraph in column 2 of page 6 of its specification to include the photo-cell pickup of the U. S. patent to Ranger, No. 1,807,011, dated May 26, 1931. The image signal representing the scanned object, however produced, appears in a coupling or connection 14 shown schematically on the drawing which supplies it to the modulator 11. Generation and frequency modulation of a subcarrier may be obtained as disclosed in U. S. Patent No. 2,326,740, granted to M. Artzt on August 17, 1943. The output from the modulator 11 is connected through a band pass filter 12 and a connection 16 to a radio transmitter 17 which may operate at any desired frequency so as to provide for communication with more or less remotely located receiving systems.

Units 21, 22, and 23 constitute an additional set of terminal equipment for a facsimile channel which is capable of developing signals similar to those developed in the above described channel comprising the units 10, 11, and 12. The output of the scanner 21 appears in a connection 26, and after modulation and filtering in the conventionally represented units 22 and 23, it is applied over a connection 28 to the radio transmitter 17. For the arrangement shown in Fig. 1, the band pass filters 12 and 23 occupy different portions of the audio spectrum to pass the modulated subcarriers which differ in frequency from each other.

The scanners 10 and 21 are driven in synchronism with each other by alternating current derived from or controlled by the output of a standard frequency source 31. The output of the standard frequency source 31 is applied to a frequency divider 33. Amplifiers 34 and 36 serve to amplify the output of the frequency divider or the outputs of frequency controlled generators for supplying a driving motor (not shown) in each of the scanner modulators.

The connections between the scanners 10 and 21 and the radio transmitter 17 may be interchanged by operation of a switch 38 which, for purposes of illustration, is shown as a relay equipped with two contact tongues 39 and 41, one cooperating with front and back contacts 43 and 46, and the other cooperating with front and back contacts 44 and 48. Switching, in accordance with the invention, may be accomplished by an electronic switch for short-time operations, an applicable switching system being disclosed in an application for Letters Patent of the United States entitled "Electronic Switching System," bearing Serial No. 502,616 and filed September 16, 1943, in the name of the present inventor jointly with Eugene R. Shenk. With the contact tongues of the relay 38 in the position of Fig. 1 of the drawings, the scanner 10 is connected to the modulator 11 and the equipment which follows it, and this may be assumed as the normal channel connection for this scanner. Likewise, the scanner 21 is connected to the modulator 22 and its associated equipment. A current reversal in the operating winding of the relay 38 will cause the contact tongues to engage their front contacts whereupon the scanner 10 will be transmitting to the modulator 22 and the scanner 21 will be transmitting to the amplifier 11.

In the illustrative arrangement of the drawing, where the invention is applied to the derivation and transmission of image signals, the switching operation must be started and completed during the "framing pulse interval" in order not to interfere with the transmission of signals representative of the desired subject matter from either of the scanner modulators. The framing pulse interval previously referred to or the "correction pulse region," as it is sometimes known, occurs following the transmission of each scanning line.

Operation of the relay 38 is accomplished by a relay control unit 52 driven by a synchronous motor 54 in timed relationship with the operation of the scanners 10 and 21. The accuracy of the timed relationship of the control unit 52 may be insured by supplying the motor 54 with operating power from a drive amplifier 56*a* connected to the common input of amplifiers 34 and 36. The relay control unit 52 may comprise a tape sensing device such as the Wheatstone transmitter which is well known and adequately described in H. H. Harrison's book on "Printing Telegraph Systems and Mechanisms," page 176, published in 1923 by Longmans Green and Company, London, England, and which is shown in U. S. Patent No. 2,020,822, granted to J. L. Callahan et al. on November 12, 1935. The tape transmitter illustrated by Fig. 2 of this Callahan et al. patent and the control relay associated with the tape transmitter are suitable for the purpose, provided that the tape transmitter has a jockey roller or the like therein, or that the relay is of the type which maintains its armature position unchanged until the current in its operating winding is reversed. A relay of this type is known as a "banking" polar relay. The tape transmitters of the publication and the patent may be mechanically driven at a desired speed, and for the purposes of the present invention, the motor 54 is speed controlled or regulated as stated above. The tape feeler pins enter marking or spacing holes 55 and 56 respectively in the conventional tape 58 which is provided with feeding holes 59. The marking and spacing holes are punched in the tape in a random manner so that channel reversal in Fig. 1, or Fig. 3 to be described, occurs in an entirely unpredictable manner. A trigger action in the operation of the relay will avoid inadvertent garbling of the copy but will not interfere with the deliberate garbling of the copy. An electronic switch inherently provides trigger action and the tape transmitter and relay of control may be modified to provide a trigger action in the manner pointed out above.

It will be understood that the tape transmitter included as a part of the relay control unit 52 may be of the photo-electric type and that the relay 38 may be of the high speed response type which will facilitate very rapid channel reversal. The principal limitation on the operation of the reversing switch 38, whether it is electromagnetic or electronic, is that it must not generate or give rise to a signal which will be transmitted along with the image signals to serve as a clue to the time-occurrence of channel reversing.

Figure 2:
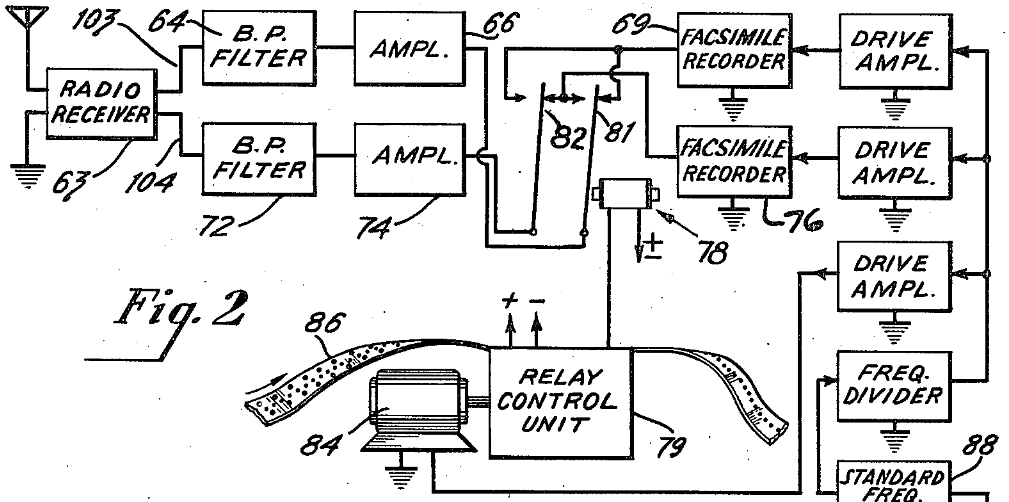
Fig. 2 is a diagrammatic showing of a receiving station in accordance with the invention.

The receiving equipment shown by Fig. 2 includes a radio receiver 63 of any desired type capable of receiving the modulated signal transmitted by the radio transmitter 17 of Fig. 1. Two channels are provided through the receiving apparatus, one comprising a band pass filter 64, an amplifier 68, and a facsimile recorder 69. The other channel comprises a band pass filter 72, an amplifier 74, and a facsimile recorder 76. The band pass filter 64 will be designed to have substantially the same band pass characteristics as the filter 12, while the filter 72 will be designed to have substantially the band pass filter characteristics of the filter 23. The band pass characteristics of the filters of Fig. 1 and Fig. 2 will be selected, it will be understood, in view of the subcarrier frequencies allotted to the modulators 11 and 22 modified by the expected band width occupied by the image signal. The recorders 69 and 76 may be of any well known kind or type, for example the type disclosed in the above noted Ranger patent, No. 1,803,133, or they may be of the continuous type described in the above noted Artzt patent.

A switching device 78, shown as a relay substantially identical with the polar relay of Fig. 1, provides for switching the recorders from one channel to the other under control of a relay control unit 79. The relay 78, like the relay 38, is provided with contact tongues 81 and 82 each of which cooperates with a front and a back contact to provide channel switching in a manner already fully described. The relay control unit is driven by a motor 84 and is served by a tape 86, which for a given operation is identical with the tape of Fig. 1 of the drawings.

The recorders 69 and 76 and the relay control unit 79 are all maintained in step with each other and with the apparatus at the transmitting station of Fig. 1 by a standard frequency source 88 which is constrained to operate in unison with the source 31 by any well known means such as an accurate tuning fork or the like.

To review the operation of the system, the signal in the one channel will consist of a number of image scanning lines from one scanner and then from the other. Nothing in the transmitted signal indicates that such switching has been done. To reassemble the image lines into a complete image, switching at the receiving end in direct accordance with switching at the transmitting terminal is mandatory. Since this switching is a local function, it cannot be ascertained from the transmitted signal. The switching sequence is not logical but random and can be decoded only with the switching tape as a key.

If the switching means 52 or its equivalent is not used with a properly punched tape, the received image is the result of superposition of the two transmitted images. In operation of the system as described, an operator at an unauthorized receiving station will believe that he has obtained a true copy even though that copy may be completely false.

Where there is no means of communication between the transmitting station and the receiving station other than the facsimile channel or channels, and where the time of starting of the receiving tape can only be indicated from received signals, it is possible to provide for a prearranged number of channel reversals before the relay control unit 52 is to be started. This is not in the nature of a signal which can be interpreted by an unauthorized observer at an unauthorized station as a special signal.

Figs. 3 and 4 of the drawings indicate a slight modification of the arrangement of Figs. 1 and 2 in which separate radio channels are employed between the transmitting station and the receiving station. In Fig. 3, two separate radio transmitters 91 and 92 operate with different carrier frequencies conveniently to obtain desired channel separation. The input connections to these transmitters designated 94 and 96, respectively, may be connected to output connections 16 and 28, respectively, of Fig. 1. Each of the transmitters is provided with an antenna system 98 which is of any suitable type. The filters 12 and 23, while not necessary, will usually be retained for the purpose of improving the signal from the scanner modulator by attenuating undesired frequency components.

Fig. 4 discloses a receiver arrangement which may be employed to receive signals from the transmitters of Fig. 3. Radio receivers 101 and 102 are arranged to be tuned respectively to the transmission frequencies of transmitters 91 and 92. The output from these receivers may be connected to the input connections 103 and 104 of the band pass filters 64 and 72, respectively, of Fig. 2. It will be understood that, if desired, these connections may be made directly to the relay contact tongues 81 and 82 where the recorders 69 and 76 are provided with the usual amplifying facilities.

In place of a radio frequency link, carrier communication channels may be employed between the transmitting and receiving stations, secrecy of communication being guarded by permitting access to the carrier terminal equipment for the scanner modulators and the recorders only to those who are authorized to operate the equipment so as to obtain intelligible transmission and reception.

Having now described the invention, what is claimed and desired to be secured by Letters Patent is the following:

A facsimile transmission system for insuring communication privacy comprising a plurality of facsimile scanners, a corresponding number of communication channels having terminal connections suitable for receiving image signals generated by said scanners, switching means comprising a relay having an operating winding for associating any one of said scanners with any one of said communication channels, a tape sensing device for producing current reversal in said relay winding, and a tape prepared with entirely random code indications for operating said tape sensing device in a manner to confuse image signals from one of said scanners with image signals from one or more of the remaining scanners appearing in a given communication channel whereby an unauthorized recorder connected to said given communication channel will record an image which is a false representation of an image intended for transmission.

References Cited in the file of this patent

UNITED STATES PATENTS

| | | |
|---|---|---|
| 1,598,673 | Blackwell et al. | Sept. 7, 1926 |
| 1,606,763 | Hartley | Nov. 16, 1926 |
| 1,763,358 | Jenkins | June 10, 1930 |
| 1,851,748 | Belin | Mar. 29, 1932 |
| 1,945,014 | Wrede | Jan. 30, 1934 |
| 2,094,132 | Miller | Sept. 28, 1937 |
| 2,292,387 | Markey et al. | Aug. 11, 1942 |
| 2,300,664 | Francis | Nov. 3, 1942 |
| 2,343,290 | Francis | Mar. 7, 1944 |
| 2,414,101 | Hogan | Jan. 14, 1947 |